(12) United States Patent
Trainin et al.

(10) Patent No.: US 9,479,958 B2
(45) Date of Patent: Oct. 25, 2016

(54) DEVICE, SYSTEM AND METHOD OF LINK MEASUREMENT OF A WIRELESS COMMUNICATION LINK

(71) Applicant: INTEL CORPORATION, Santa Clara, CA (US)

(72) Inventors: Solomon B. Trainin, Haifa (IL); Assaf Kasher, Haifa (IL); Tom Harel, Shfaim (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/614,436

(22) Filed: Feb. 5, 2015

(65) Prior Publication Data

US 2015/0223096 A1    Aug. 6, 2015

Related U.S. Application Data

(63) Continuation of application No. 13/628,615, filed on Sep. 27, 2012, now Pat. No. 8,989,038.

(60) Provisional application No. 61/675,917, filed on Jul. 26, 2012.

(51) Int. Cl.
*H04W 24/00* (2009.01)
*H04W 24/10* (2009.01)
*H04B 7/04* (2006.01)
(Continued)

(52) U.S. Cl.
CPC .............. *H04W 24/10* (2013.01); *H04B 7/04* (2013.01); *H04W 28/0231* (2013.01); *H04W 52/0209* (2013.01)

(58) Field of Classification Search
USPC ........ 370/252, 328–329, 338, 470–471, 473; 375/260, 285, 295
See application file for complete search history.

(56) References Cited

U.S. PATENT DOCUMENTS 7,003,290 B1    2/2006  Salonaho et al.
8,249,105 B2 *  8/2012  Joshi .................... H04W 28/06
                                                            370/470

(Continued)

FOREIGN PATENT DOCUMENTS

WO    2012044861    4/2012

OTHER PUBLICATIONS

International Search Report and Written Opinion for PCT Application No. PCT/US2013/047208, mailed on Sep. 30, 2013, 12 pages.

(Continued)

*Primary Examiner* — Mohamed Kamara
(74) *Attorney, Agent, or Firm* — Shichrur & Co.

(57) ABSTRACT

Some demonstrative embodiments include devices, systems and/or methods of link measurement of a wireless communication link. For example, a wireless communication unit may communicate a link measurement request frame between an initiator station and a responder station; may communicate a first link measurement report frame in response to the link measurement request frame, the link measurement report frame including link information determined by the responder station with respect to a wireless communication link between the initiator station and the responder station; and/or may communicate a second, unsolicited, link measurement report frame including link information determined by the initiator station with respect to the wireless communication link.

24 Claims, 5 Drawing Sheets

(51) Int. Cl.
  *H04W 28/02* (2009.01)
  *H04W 52/02* (2009.01)

(56) References Cited

U.S. PATENT DOCUMENTS

| | | | |
|---|---|---|---|
| 8,681,888 B1* | 3/2014 | Lee | H04L 1/0003 375/260 |
| 2005/0122912 A1* | 6/2005 | Jeon | H04L 1/0003 370/252 |
| 2010/0234059 A1 | 9/2010 | Yang et al. | |
| 2012/0182893 A1 | 7/2012 | Trainin et al. | |
| 2014/0029453 A1 | 1/2014 | Trainin et al. | |

OTHER PUBLICATIONS

Tae-Jin Lee, et al., "Measurement Request and Report for Link Margin Information", IEEE 802.11-03/491r0, Jul. 2003, 13 pages.
Jianhan Liu, et al., "Open-Loop Link Margin Index for Fast Link Adaptation", IEEE 802.11-12/0645, May 10, 2012, 11 pages.
Payam Torab, et al., "Channel Measurement Feedback Element", IEEE 802.11-12/0793r0, Jul. 6, 2012, 3 pages.
Solomon Trainin, et al., "Link Measurement", IEEE 802.11-12/0740r0, Jun. 14, 2012, 5 pages.
Shadi Abu-Surra et al., "PHY/MAC Complete Proposal Specification", IEEE 802.11-10/0433r2, May 18, 2010, 335 pages.
Wireless Gigabit Alliance (WGA) Specifications; WiGig MAC and PHY Specification Version 1.0, Apr. 2010—Final Specification; 311 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
International Preliminary Report on Patentability for International Patent Application No. PCT/US2013/047208, mailed on Feb. 5, 2015, 8 pages.
Office Action for U.S. Appl. No. 13/628,615, mailed on Jul. 1, 2014, 29 pages.
IEEE P802.11ad™/D0.1, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6: Enhancements for Very High Throughput in the 60 GHz Band, Jun. 2010, 357 pages.
European Search Report for European Patent Application No. 13822706.1, mailed on Feb. 24, 2016, 8 pages.
Solomon Tranin et al: "Link measurement IEEE 802.11-12/0740R0", Jun. 14, 2012, XP055176770, Retrieved from the Internet: URL:https://mentor.ieee.org/802.11/dcn/12/11-12-0740-00-00ad-link-measurement.docx [retrieved on Mar. 16, 2015], 5 pages.

* cited by examiner

DEVICE, SYSTEM AND METHOD OF LINK MEASUREMENT OF A WIRELESS COMMUNICATION LINK

CROSS REFERENCE

This application is a Continuation Application U.S. patent application Ser. No. 13/628,615, filed Sep. 27, 2012, which claims the benefit of and priority from U.S. Provisional Patent Application No. 61/675,917 entitled "Device, system and method of link measurement of a wireless communication link", filed Jul. 26, 2012, the entire disclosures of which are incorporated herein by reference.

BACKGROUND

Link adaptation techniques may use different methods, processes and/or algorithms of link measurement to provide interacting peers, e.g., stations, with information about a wireless link between the peers. The information may be used by a transmitter, for example, to adapt one or more transmit parameters for communication over the wireless link, e.g., a Modulation and Coding Scheme (MCS), a transmit power, an antenna configuration, and the like.

The link adaptation techniques may utilize various link measurement requests and responses with various information elements. For example, the Wireless Gigabit Alliance (WGA) Specification defines a measurement report element, a link adaptation procedure and a link adaptation procedure.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
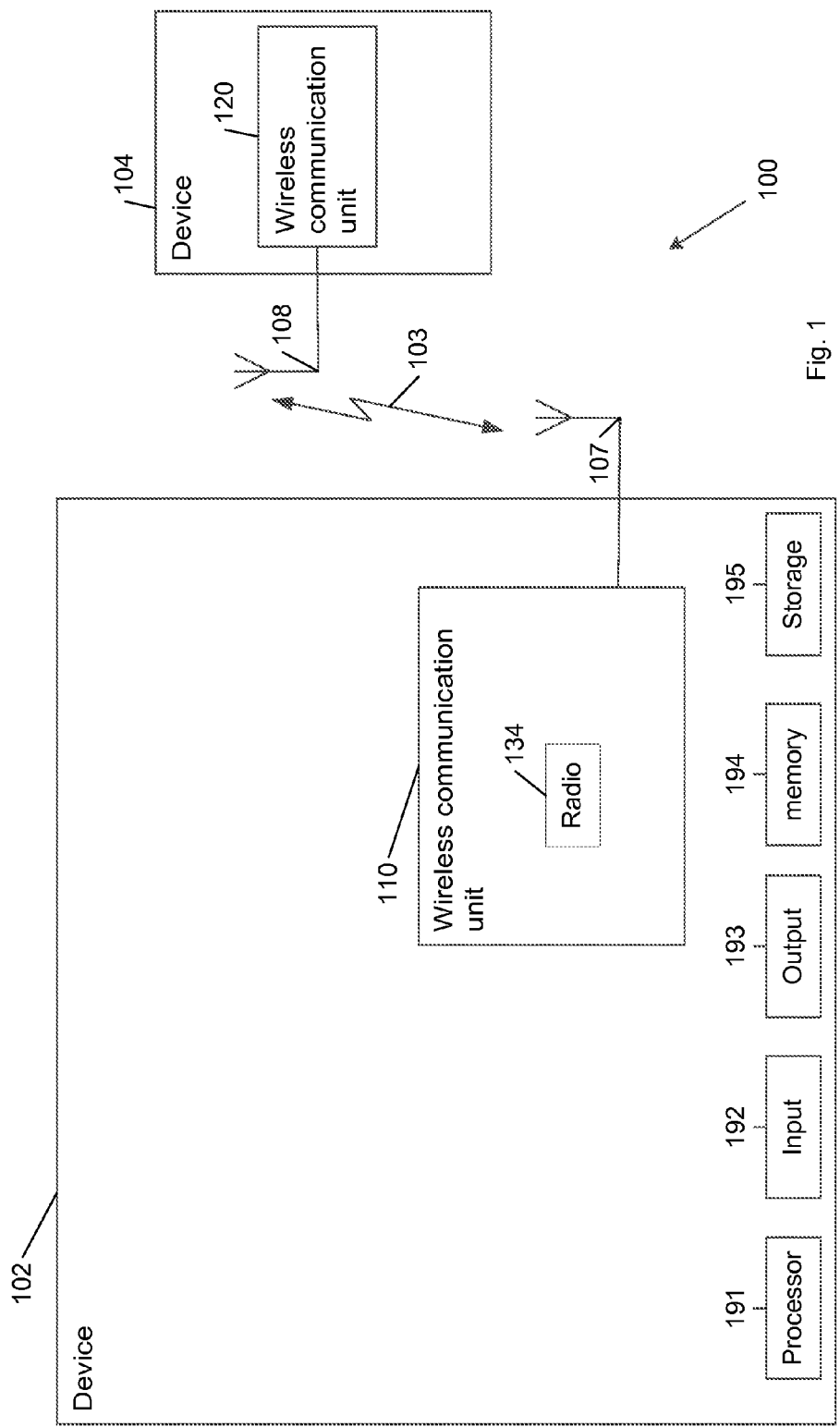
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (IEEE 802.11,2012, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE802.11 task group ac (TGac) ("IEEE802.11-09/0308r12—TGac Channel Model Addendum Document"); IEEE 802.11 task group ad (TGad) (IEEE P802.11ad/D9.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless- WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "service period" (SP), as used herein, may relate to a contiguous time during which one or more individually addressed frames are transmitted to a STA, e.g. a quality of service (QoS) STA, and/or one or more transmission opportunities (TxOPs) are granted to the same STA.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve the received signal power or signal-to-noise ratio (SNR) at an intended receiver.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102 and/or 104, capable of communicating content, data, information and/or signals over at least one wireless communication link 103, for example, a radio channel, an IR channel, a RF channel, a Wireless Fidelity (WiFi) channel, and the like. One or more elements of system 100 may optionally be capable of communicating over any suitable wired communication links In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 104 may include wireless communication units 110 and/or 120, respectively, to perform wireless communication between wireless communication devices 102 and/or 104 over wireless communication link 103.

Wireless communication devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

In some demonstrative embodiments, wireless communication units 110 and 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication units 110 and/or 120 include, for example, one or more radios 134, e.g., including one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some demonstrative embodiments, wireless communication unit 110 may perform the functionality of at least one first station, e.g., at least one first DMG station, and/or wireless communication unit 120 may perform the functionality of at least one second station, e.g., at least one second DMG station.

In some demonstrative embodiments, wireless communication devices 102 and/or 104 may be configured to communicate over the DMG band. For example, wireless communication units 110 and/or 120 may establish at least one wireless communication link 103 over the DMG band.

In one example, devices 102 and/or 104 may be configured to establish two or more different wireless communication links, for example, one or more wireless communication links for transmissions from device 102 to device 104 and/or one or more wireless communication links for transmissions from device 104 to device 102.

In some demonstrative embodiments, wireless communication units 110 and/or 120 may be configured to utilize methods, processes and/or algorithms of link measurement to provide devices 102 and/or 104, with link information about wireless communication link 103.

In some demonstrative embodiments, the link information may be used by wireless communication units 110 and/or 120, for example, to adapt one or more transmit parameters for communication over wireless communication link 103, e.g., a Modulation and Coding Scheme (MCS), a transmit power, an antenna configuration, and/or the like.

In some demonstrative embodiments, wireless communication units 110 and/or 120 may utilize link measurement requests and/or responses for link measurement. For example, wireless communication units 110 and/or 120 may utilize a link measurement request frame and a link measurement report frame, e.g., as described below.

In some demonstrative embodiments, system 100 may include an initiator station and a responder station to communicate over wireless communication link 103. For example, one of wireless communication units 110 and 120 may perform the functionality of the initiator station, and/or one of wireless communication units 110 and 120 may perform the functionality of the responder station.

In some demonstrative embodiments, the initiator station may be configured to transmit a link measurement request frame to the responder station, and the responder station may be configured to transmit a link measurement report frame to the initiator, in response to the link measurement response frame.

In some demonstrative embodiments, the link measurement report frame may be received after a relatively long time, for example, if a response time, e.g., a maximal time, is not defined for the responder to respond to the link measurement request.

For example, in a DMG Link adaptation process described by the WGA specification, the responder station may provide the link measurement report in response to the link measurement request. However, a latency of the response according to the WGA specification may be unpredictable.

A link adaptation process, may provide a fast response with multiple-in-multiple-out (MIMO) specific MCS feedback. However, such process may not be applicable for DMG Beamforming procedures, which may require support for multiple multi-element antennas and may limit time for channel computation.

In some demonstrative embodiments, a response time, e.g., a maximal time, provided to a station to respond to a link measurement request may be defined. Utilizing the predefined response time may ensure, for example, that the response is not received after a relatively long time period.

Some demonstrative embodiments described herein may be implemented, for example, to address specific needs of the DMG network.

Some demonstrative embodiments described herein may be implemented to provide a solution for fast delivery of link conditions achieved by beam training Some demonstrative embodiments described herein may enable delivering to a transmitter of a beamformed link MCS, e.g., the initiator station, recommended by a receiver of the link, e.g. the responder station.

Some demonstrative embodiments may enable delivering the recommended MCS to both sides of the beamformed link, e.g., to both the initiator station and the responder station.

In some demonstrative embodiments, the link may be kept occupied during time needed for the computation of link measurement information, e.g., by transmissions from the initiator and/or responder. Accordingly, intervention of a third party during closure of a beam training procedure may be avoided.

In some demonstrative embodiments, wireless communication units 110 and/or 120 may be configured to inform another wireless communication device, e.g., another DMG station, of an ability to perform a predefined link adaptation ("fast link adaptation"), e.g., as described below.

In some demonstrative embodiments, wireless communication units 110 and/or 120 may communicate a Fast Link Adaptation field, which may be included as part of an information field, e.g., a DMG STA Capability Information field. The Fast Link Adaptation field may have a predefined value, e.g., one, for example, to indicate that wireless communication units 110 and/or 120 support the fast link adaptation. The Fast Link Adaptation field may have another predefined value, e.g., zero, for example, to indicate that wireless communication units 110 and/or 120 do not support the fast link adaptation.

In some demonstrative embodiments, wireless communication units 110 and/or 120 may not use fast link adaptation, for example, when communicating with another wireless communication unit, which does not support fast link adaptation.

In some demonstrative embodiments, wireless communication units 110 and/or 120 may communicate a link measurement request frame, which is transmitted from an initiator station to a responder station; may communicate a first link measurement report frame in response to the link measurement request frame, the first link measurement report frame including link information determined by the responder station with respect to wireless communication link 103; and may communicate a second, unsolicited, link measurement report frame including link information determined by the initiator station with respect to wireless communication link 103, e.g., as described in detail below.

In some demonstrative embodiments, wireless communication unit 110 may perform the functionality of the initiator station, and wireless communication unit 120 may perform the functionality of the responder station. For example, wireless communication unit 110 may communicate the link measurement request frame to wireless communication unit 120.

In some demonstrative embodiments, a Physical Layer Convergence Protocol Data Unit (PPDU) including the link measurement request frame may include a Physical Layer Service Data Unit (PSDU) having a duration which is equal to or greater than a predefined duration ("the minimal PSDU duration"), e.g., to enable wireless communication unit 120 to determine the first link measurement report. For example, the minimal PSDU duration may be at least 5.27 microseconds (us).

In some demonstrative embodiments, wireless communication unit 120 may receive the PPDU including the link measurement request frame.

In some demonstrative embodiments, wireless communication unit 120 may determine link information with respect to wireless communication link 103 based on the PPDU including the link measurement request frame.

In some demonstrative embodiments, wireless communication unit 120 may communicate one or more PPDUs during a time period ("the first report time period") between the reception of the link measurement request frame and the communicating of the first link measurement report, e.g., to maintain wireless communication link 103 during the first report time period.

In some demonstrative embodiments, a number of the one or more PPDUs may be based on a duration of the first report time period, for example, such that an inter-frame-space (IFS) during the first report time period may not be longer than a short-inter-frame-space (SIFS), e.g., to avoid intervention of another station during the first report time period.

In some demonstrative embodiments, the one or more PPDUs may have a predefined duration, which may enable wireless communication unit 110 to determine the second link measurement report based on one or more of the PPDUs. For example, the duration of a PPDU of the one or more PPDUs, which may be measured according to a duration of a PSDU included in the PPDU, may be equal to or greater than the minimal PSDU duration.

In some demonstrative embodiments, the PSDU of the PPDU may be padded with a plurality of delimiters, e.g., to increase the duration of the PSDU to at least the minimal PSDU duration. For example, the PSDU may be padded with MAC Protocol Data Unit (MPDU) delimiters, e.g., of zero size, in order to increase the duration of the PSDU to at least the minimal PSDU duration.

Figure 2:
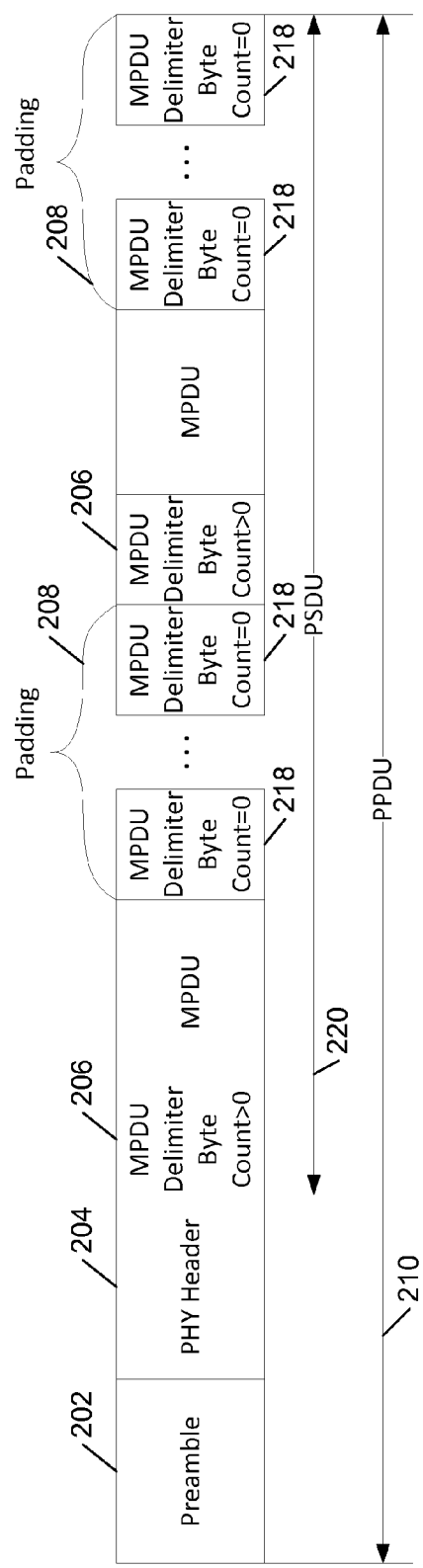
FIG. 2 is a schematic illustration of a padded Physical Layer Convergence Protocol Data Unit (PPDU), in accordance with some demonstrative embodiments.

Reference is now made to FIG. 2, which schematically illustrates a padded PPDU 210, in accordance with some demonstrative embodiments. In some demonstrative embodiments, PPDU 210 may be transmitted by a wireless communication unit, e.g., wireless communication unit 120 (FIG. 1) and/or wireless communication unit 110 (FIG. 1), over a wireless communication link, e.g., wireless communication link 103 (FIG. 1).

As shown in FIG. 2, PPDU 210 may include a preamble 202, a PHY Header 204 and a PSDU 220.

As shown in FIG. 2, PSDU 220 may include one or more MPDU delimiters 206 with a byte count, which is greater than zero.

In some demonstrative embodiments, PSDU 220 may be configured to have at least the minimal PSDU duration, e.g., 5.27 us.

As shown in FIG. 2, one or more padding portions 208 of PSDU 220 may be padded with one or more MPDU delimiters 218, for example, having a zero delimiter byte count, e.g., to increase the duration of PSDU 210 to at least the minimal PSDU duration.

Referring back to FIG. 1, in some demonstrative embodiments, wireless communication unit 120 may communicate the first link measurement report frame in response to the link measurement request frame, e.g., after determining the link information. For example, the first link measurement report frame may include a transmit power control (TPC) Report element, a DMG Link Margin element and/or any other elements, which may be determined based on the PPDU that contained the link measurement request.

In some demonstrative embodiments, wireless communication unit 120 may communicate the first link measurement report frame no longer than a predefined report time period from reception of the link measurement request frame by wireless communication unit 120.

In some demonstrative embodiments, the predefined report time period may include a beam refinement protocol inter-frame space (BRPIFS). For example, the first report time period may not be longer than BRPIFS.

In some demonstrative embodiments, a PSDU of a PPDU including the first link measurement report frame may have a predefined duration, e.g., to enable wireless communication unit 110 to determine the second link measurement report using the PPDU including the first link measurement report frame. For example, the predefined duration of the PSDU may be equal to or greater than the minimal PSDU duration.

In some demonstrative embodiments, wireless communication unit 110 may receive one or more data units from wireless communication unit 120, e.g., the one or more PPDUs and/or the first link measurement report.

In some demonstrative embodiments, wireless communication unit 110 may determine link information with respect to wireless communication link 103 during a time period ("the second report time period"), e.g., based on measurements performed on one or more of the received data units.

For example, wireless communication unit 110 may determine the link information based on the first link measurement report frame and/or one or more of the PPDUs received by wireless communication unit 110, e.g., prior to the first link measurement report frame.

In some demonstrative embodiments, wireless communication unit 110 may communicate the second, unsolicited, link measurement report frame including the link information determined by wireless communication unit 110 with respect to wireless communication link 103.

In some demonstrative embodiments, wireless communication unit 110 may communicate the second link measurement report frame in response to the first link measurement report frame, e.g., without being solicited by a dedicated request frame from wireless communication unit 120.

In some demonstrative embodiments, wireless communication unit 110 may communicate the second link measurement report frame no longer than the predefined report time period, e.g., no longer than BRPIFS, from the reception of the first link measurement report frame. For example, the second report time period, which may include the time period between the reception of the first link measurement report frame and communicating the second link measurement report frame, may not be longer than BRPIFS.

In some demonstrative embodiments, wireless communication unit 110 may communicate one or more PPDUs during the second report time period, e.g., to maintain wireless communication link 103 during the second report time period.

In some demonstrative embodiments, a number of the one or more PPDUs may be based on a duration of the second report time period, for example, such that an IFS during the second report time period may not be longer than SIFS, e.g., to avoid intervention of another station during the second report time period.

In some demonstrative embodiments, wireless communication unit 110 may communicate the second link measurement report frame within no more than two BRPIFS periods after reception of the link measurement request frame by wireless communication unit 120. For example, the sum of the first report time period and the second report time period may not be longer than two BRPIFS.

In some demonstrative embodiments, wireless communication units 110 and/or 120 may support a reverse direction (RD) protocol, e.g., as defined by the WGA specification. For example, transmission of the link measurement request, the first and the second link measurement reports and/or any other frames defined herein may follow the rules of the reverse direction protocol. In one example, wireless communication unit 110 may perform the functionality of an RD initiator STA, and wireless communication unit 120 may perform the functionality of an RD responder STA.

Figure 3:
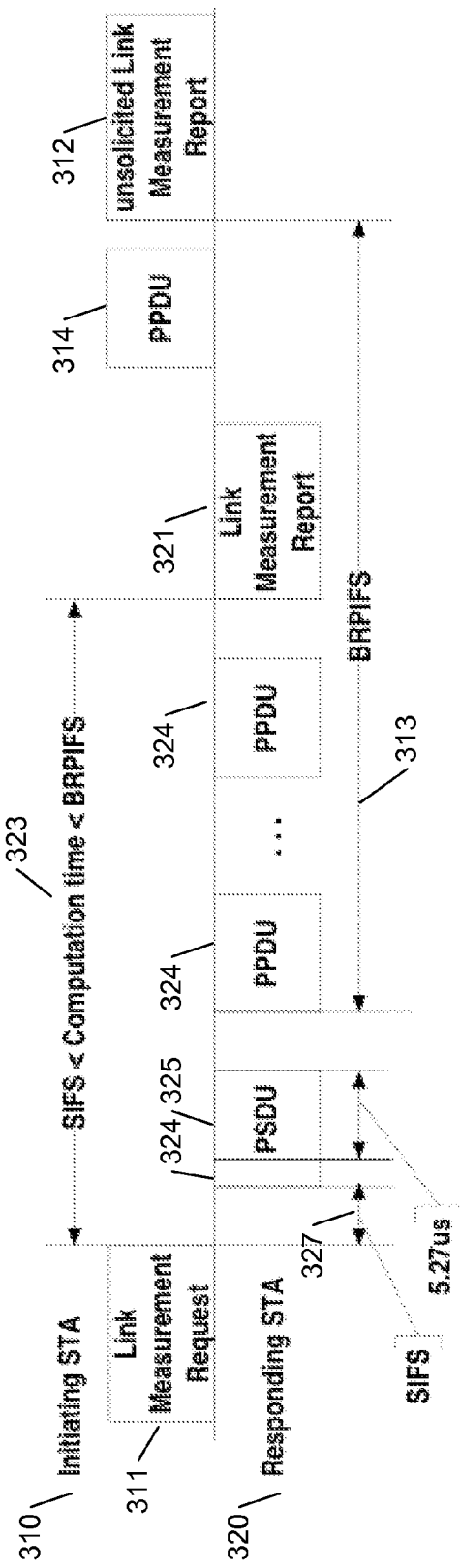
FIG. 3 is a schematic illustration of a sequence of frames exchanged between an initiating station and a responding station, in accordance with some demonstrative embodiments.

Reference is now made to FIG. 3, which schematically illustrates a sequence 300 of frames exchanged between an initiating station (STA) 310 and a responding station (STA) 320, in accordance with some demonstrative embodiments. In some demonstrative embodiments, wireless communication unit 110 (FIG. 1) may perform the functionality of initiating station 310, and/or wireless communication unit 120 (FIG. 1) may perform the functionality of responding station 320.

As shown in FIG. 3, initiating station 310 may transmit a link measurement request frame 311, responding station 320 may transmit a first link measurement report frame 321, e.g., in response to link measurement request frame 311, and initiating station 310 may transmit a second, unsolicited, link measurement report frame 312, e.g., in response to first link measurement report frame 321.

In some demonstrative embodiments, link measurement request frame 311 may be of a frame type, which may not require an acknowledgement (Ack) frame from responding station 320. For example, link measurement request frame 311 may be of a subtype Action no acknowledge (No Ack).

In some demonstrative embodiments, link measurement request frame 311 may enable responding station 320 to determine first link measurement report frame 321 based on a frame received from initiating station 310, e.g., link measurement request frame 311.

In some demonstrative embodiments, a PPDU containing link measurement request frame 311 may include an indication that the PPDU contains an aggregate MAC protocol data unit (A-MPDU) aggregation, e.g., to enable padding of the PPDU. For example, the PPDU may contain an AGGREGATION field in a PHY Header set to AGGREGATED.

In some demonstrative embodiments, the PPDU may not contain a frame, which requires immediate response.

In some demonstrative embodiments, the PPDU may have a duration, which may enable measurement of the wireless communication link. For example, the duration of the PPDU, e.g., as measured according to a PHY-TXTIME.confirm primitive, may be at least the minimal PSDU duration, e.g., at least 5.27 us.

As shown in FIG. 3, responding station 320 may transmit first link measurement report frame 321 a first report time period 323 from reception of link measurement request frame 311. For example, first report time period 323 may include a computation time, which is required for responding station 320 to determine first link measurement report 321.

As shown in FIG. 3, first report time period 323 may not be longer than the predefined report time, e.g., BRPIFS, and may not be shorter than SIFS.

For example, link measurement request frame 311 may include a dialog token field set to a predefined value, e.g., zero, to indicate to responding station 320 that link measurement request frame 311 requires response no longer than BRPIFS.

In some demonstrative embodiments, first link measurement report frame 321 may be of a frame type, which may not require an acknowledgement (Ack) frame from initiating station 310. For example, first link measurement report frame 321 may be of a subtype Action No Ack.

In some demonstrative embodiments, first link measurement report frame 321 may be transmitted using a predefined MCS, e.g., DMG MCS 1.

In some demonstrative embodiments, a PPDU containing first link measurement report frame 321 may include an indication that the PPDU contains A-MPDU aggregation. For example, the PPDU may contain the AGGREGATION field in the PHY Header set to AGGREGATED.

In some demonstrative embodiments, the PPDU may not contain a frame that requires immediate response.

In some demonstrative embodiments, the PPDU may have a duration, which may enable measurement of the wireless communication link. For example, the duration of a PSDU of the PPDU may be at least the minimal PSDU duration, e.g., at least 5.27 us.

As shown in FIG. 3, responding station 320 may communicate one or more PPDUs 324 during first report time period 323, e.g., such that an IFS during first report time period 323 may not be longer than SIFS 327.

In some demonstrative embodiments, all PPDUs 324 may have the same MCS e.g., DMG MCS1, and the same transmit power.

In some demonstrative embodiments, PPDUs 324 may include the indication that PPDUs 324 contain an A-MPDU aggregation. For example, PPDUs 324 may contain an AGGREGATION field in the PHY Header set to AGGREGATED.

In some demonstrative embodiments, PPDUs 324 may not contain frames requiring immediate response.

In some demonstrative embodiments, PPDUs 324 may include a PSDU 325 having a duration, which may enable measurement of the wireless communication link. For example, the duration of PSDU 325 may be at least the minimal PSDU duration, e.g., at least 5.27 us.

In one example, PPDUs 324 may include quality of service (QoS) Null packets, having a predefined MCS, e.g., DMG MCS1.

In some demonstrative embodiments, initiating station 310 may transmit second link measurement report frame 312 no longer than the predefined report period, e.g., BRPIFS, from reception of first link measurement report frame 321.

In some demonstrative embodiments, initiating station 310 may determine second link measurement report frame 312 during a second report time period 313 between reception of a data unit, e.g., any data unit, from responding station 320, e.g., PPDUs 324, and transmission of second link measurement report frame 312. For example, second report time period 313 may include a computation time, which is required for initiating station 310 to determine second link measurement report 312.

As shown in FIG. 3 second report time period 313 may not be longer than BRPIFS.

As shown in FIG. 3, initiating station 310 may communicate one or more PPDUs 314 during a time period between reception of first link measurement report frame 321 and transmission of second link measurement report frame 312, e.g., such that an IFS during the time period between reception of first link measurement report frame 321 and transmission of second link measurement report frame 312 may not be longer than SIFS 327.

As shown in FIG. 3, initiating station 310 may communicate second link measurement frame 312 within no more than two BRPIFS periods after reception of link measurement request frame 311 by responding station 320. For example, the sum of first report time period 323 and second report time period 313 may not be longer than two BRPIFS.

In some demonstrative embodiments, responding station 320 may not be required to communicate first link measurement report frame 321 within no more than BRPIFS from reception of a link measurement request, for example, if at least one of the following conditions with respect to the link measurement request is not met: the link measurement request is of the subtype Action No Ack, the link measurement request includes the dialog token field set to zero, the link measurement request contains the AGGREGATION field in the PHY Header set to AGGREGATED, the link measurement request does not contain any frame that requires immediate response, and the link measurement request has at least the minimal PSDU duration.

In some demonstrative embodiments, initiating station 310 may not be required to communicate second link measurement report frame 312 within no more than BRPIFS from reception of a first link measurement report frame, for example, if at least one of the following conditions with respect to the first link measurement report frame is not met: the first link measurement report frame is of the subtype Action No Ack, the first link measurement report frame is transmitted using DMG MCS 1, the first link measurement report frame contains the AGGREGATION field in the PHY Header set to AGGREGATED, the first link measurement report frame does not contain any frame that requires immediate response, and the first link measurement report frame has at least the minimal PSDU duration.

In one example, wireless communication units 110 and/or 120 may utilize any other, e.g., conventional, methods, for example, if at least one of the conditions with respect to the link measurement request frame and the first link measurement report frame 321 is not met.

Figure 4:
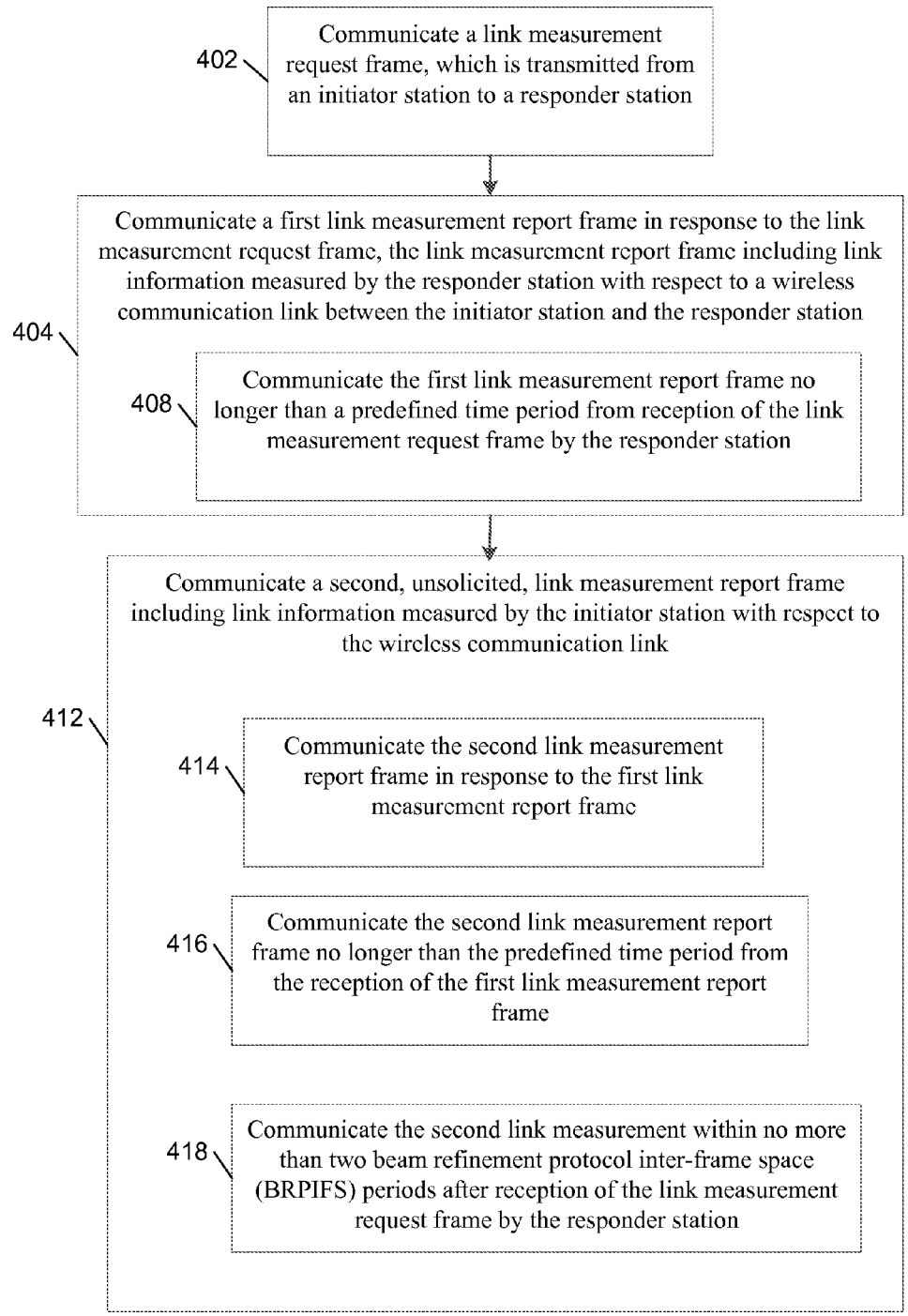
FIG. 4 is a schematic flow-chart illustration of a method of link measurement of a wireless communication link, in accordance with some demonstrative embodiments.

Reference is made to FIG. 4, which schematically illustrates a method of link measurement of a wireless communication link, in accordance with some demonstrative embodiments. In some embodiments, one or more of the operations of the method of FIG. 4 may be performed by a wireless communication system, e.g., system 100 (FIG. 1); a wireless communication device, e.g., devices 102 and/or 104 (FIG. 1); and/or a wireless communication unit, e.g., wireless communication units 110 and/or 120 (FIG. 1).

As indicated at block 402, the method may include communicating a link measurement request frame, which is transmitted from an initiator station to a responder station. For example, wireless communication unit 110 (FIG. 1) may transmit the link measurement request to wireless communication unit 120 (FIG. 1), e.g., as described above.

As indicated at block 404, the method may include communicating a first link measurement report frame in response to the link measurement request frame, the link measurement report frame including link information measured by the responder station with respect to a wireless communication link between the initiator station and the responder station. For example, wireless communication unit 120 (FIG. 1) may transmit the first link measurement report frame in response to the link measurement request frame, the link measurement report frame including the link information measured by wireless communication unit 120 (FIG. 1) with respect to wireless communication link 103 (FIG. 1), e.g., as described above.

As indicated at block 408, communicating the first link measurement report frame in response to the link measurement request frame may include communicating the first link measurement report frame no longer than a predefined time period from reception of the link measurement request frame by the responder station. For example, wireless communication unit 120 (FIG. 1) may transmit the first link measurement report frame no longer than BRPIFS from reception of the link measurement request frame, e.g., as described above.

As indicated at block 412, the method may include communicating a second, unsolicited, link measurement report frame including link information measured by the initiator station with respect to the wireless communication link. For example, wireless communication unit 110 (FIG. 1) may transmit the second link measurement report frame including the link information measured by wireless communication unit 110 (FIG. 1) with respect to wireless communication link 103 (FIG. 1), e.g., as described above.

As indicated at block 414, communicating the second link measurement report frame may include communicating the second link measurement report frame in response to the first link measurement report frame. For example, wireless communication unit 110 (FIG. 1) may transmit the second link measurement report frame in response to the first link measurement report frame, e.g., as described above.

As indicated at block 416, communicating the second link measurement report frame may include communicating the second link measurement report frame no longer than a predefined time period from the reception of the first link measurement report frame. For example, wireless communication unit 110 (FIG. 1) may transmit the second link measurement report frame no longer than BRPIFS from the reception of the first link measurement report frame, e.g., as described above.

As indicated at block 418, communicating the second link measurement report frame may include communicating the second link measurement within no more than two BRPIFS periods after reception of the link measurement request frame by the responder station. For example, wireless communication unit 110 (FIG. 1) may transmit the second link measurement report frame within no more than two BRPIFS periods after reception of the link measurement request frame by wireless communication unit 120 (FIG. 1), e.g., as described above.

Figure 5:
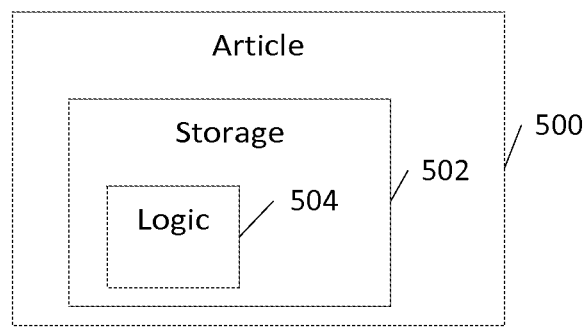
FIG. 5 is a schematic illustration of a product, in accordance with some demonstrative embodiments.

Reference is made to FIG. 5, which schematically illustrates a product 500, in accordance with some demonstrative embodiments. Product 500 may include a non-transitory machine-readable storage medium 502 to store logic 504, which may be used, for example, to perform at least part of the functionality of device 102 (FIG. 1), device 104 (FIG. 1), wireless communication unit 110 (FIG. 1), wireless communication unit 120 (FIG. 1) and/or to perform one or more operations of the method of FIG. 4. The phrase "non-transitory machine-readable storage medium" is directed to include all computer-readable media, with the sole exception being a transitory propagating signal.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising a processing system configured to cause a wireless station to:
   transmit a Physical Layer Convergence Protocol Data Unit (PPDU) including a link measurement request frame to a responding station, the PPDU including an AGGREGATION field set to AGGREGATED, a duration of the PPDU is greater than 5.27 microseconds; and
   transmit an unsolicited Link Measurement Report frame no longer than a beam refinement protocol inter-frame space (BRPIFS) from reception of a Link Measurement Report frame.

2. The apparatus of claim 1, wherein the processing system is configured to cause the wireless station to:
   receive a plurality of PPDUs from the responding station after transmission of the link measurement request frame and before reception of the link measurement report frame; and
   transmit one or more PPDUs to the responding station after reception of the link measurement report frame and before transmission of the unsolicited Link Measurement Report frame.

3. The apparatus of claim 2, wherein the processing system is to cause the wireless station to receive the plurality of PPDUs during a time period, and wherein an inter-frame-space (IFS) during said time period is not longer than a short-inter-frame-space (SIFS).

4. The apparatus of claim 2, wherein the plurality of PPDUs has a same modulation and coding scheme (MCS), and a same transmit power.

5. The apparatus of claim 1, wherein said link measurement report frame comprises at least one element based on a measurement on the PPDU including the link measurement request frame, the at least one element including at least one element selected from the group consisting of a transmit power control (TPC) Report element, and a directional multi gigabit (DMG) Link Margin element.

6. The apparatus of claim 1, wherein an Inter Frame Space (IFS) between reception of the link measurement report frame and transmission of the unsolicited link measurement report frame is not longer than a short inter frame space (SIFS).

7. The apparatus of claim 1 comprising:
   an antenna array; and
   an initiating directional multi gigabit (DMG) station including a radio, the initiating DMG station configured to support a reverse direction (RD) protocol, and to operate as an RD initiator station.

8. An apparatus comprising a processing system configured to cause a wireless station to:
   receive from an initiating station a Physical Layer Convergence Protocol Data Unit (PPDU) including a link measurement request frame, the PPDU including an AGGREGATION field set to AGGREGATED, a duration of the PPDU is greater than 5.27 microseconds;
   transmit a Link Measurement Report frame no longer than a beam refinement protocol inter-frame space (BRPIFS) from reception of the Link Measurement Request frame; and
   receive an unsolicited Link Measurement Report frame.

9. The apparatus of claim 8, wherein the processing system is configured to cause the wireless station to:
   transmit a plurality of PPDUs to the initiating station after reception of the link measurement request frame; and
   receive one or more PPDUs from the initiating station after transmission of the link measurement report frame and before reception of the unsolicited Link Measurement Report.

10. The apparatus of claim 9, wherein said processing system is to cause the wireless station to transmit the plurality of PPDUs during a time period, and wherein an inter-frame-space (IFS) during said time period is no longer than a short-inter-frame-space (SIFS).

11. The apparatus of claim 9, wherein the plurality of PPDUs has a same modulation and coding scheme (MCS), and a same transmit power.

12. The apparatus of claim 8, wherein said link measurement report frame comprises at least one element based on a measurement on the PPDU including the link measurement request frame, the at least one element including at least one element selected from the group consisting of a transmit power control (TPC) Report element, and a directional multi-gigabit (DMG) Link Margin element.

13. The apparatus of claim 8, wherein an Inter Frame Space (IFS) between transmission of the link measurement report frame and reception of the unsolicited link measurement report frame is not longer than a short inter frame space (SIFS).

14. The apparatus of claim 8 comprising:
   a phase array antenna; and
   a responding directional multi-gigabit (DMG) station including a radio, the DMG station configured to support a reverse direction (RD) protocol, and to operate as an RD responder station.

15. A product including a non-transitory storage medium having stored thereon instructions that, when executed by a machine, result in:
   transmitting to a responding station a Physical Layer Convergence Protocol Data Unit (PPDU) including a link measurement request frame, the PPDU including an AGGREGATION field set to AGGREGATED, a duration of the PPDU is greater than 5.27 microseconds;
   receiving a Link Measurement Report frame; and
   transmitting an unsolicited Link Measurement Report frame no longer than a beam refinement protocol inter-frame space (BRPIFS) from reception of the Link Measurement Report frame.

16. The product of claim 15, wherein said instructions result in:

receiving from the responding station a plurality of PPDUs after transmission of the link measurement request frame and before reception of the link measurement report frame; and transmitting to the responding station one or more PPDUs after reception of the link measurement report frame and before transmission of the unsolicited Link Measurement Report frame.

17. The product of claim 16, wherein said instructions result in:

receiving the plurality of PPDUs during a time period, and wherein an inter-frame-space (IFS) during said time period is no longer than a short-inter-frame-space (SIFS).

18. The product of claim 16, wherein the plurality of PPDUs have a same modulating and coding scheme (MCS), and a same transmit power.

19. The product of claim 15, wherein said link measurement report frame comprises at least one element based on a measurement on the PPDU including the link measurement request frame, the at least one element including at least one element selected from the group consisting of a transmit power control (TPC) Report element, and a directional multi gigabit (DMG) Link Margin element.

20. A product including a non-transitory storage medium having stored thereon instructions that, when executed by a machine, result in:

receiving from an initiating station a Physical Layer Convergence Protocol Data Unit (PPDU) including a link measurement request frame, the PPDU including an AGGREGATION field set to AGGREGATED, a duration of the PPDU is greater than 5.27 microseconds;

transmitting a Link Measurement Report frame no longer than a beam refinement protocol inter-frame space (BRPIFS) from reception of the Link Measurement Request frame; and receiving an unsolicited Link Measurement Report frame.

21. The product of claim 20, wherein said instructions result in:

transmitting to the initiating station a plurality of PPDUs after reception of the link measurement request frame; and receiving from the initiating station one or more PPDUs after transmission of the link measurement report frame and before reception of the unsolicited Link Measurement Report frame.

22. The product of claim 21, wherein said instructions result in:

transmitting the plurality of PPDUs during a time period, and wherein an inter-frame-space (IFS) during said time period is no longer than a short-inter-frame-space (SIFS).

23. The product of claim 21, wherein the plurality of PPDUs have a same modulating and coding scheme (MCS), and a same transmit power.

24. The product of claim 20, wherein said link measurement report frame comprises at least one element based on a measurement on the PPDU including the link measurement request frame, the at least one element including at least one element selected from the group consisting of a transmit power control (TPC) Report element, and a directional multi gigabit (DMG) Link Margin element.

* * * * *